(12) United States Patent
Hillert et al.

(10) Patent No.: US 8,074,423 B2
(45) Date of Patent: Dec. 13, 2011

(54) PARQUET JOINT KIT SYSTEM AND METHOD FOR MANUFACTURING A PARQUET JOINT KIT SYSTEM

(75) Inventors: Götz Hillert, Pirmasens (DE); Martin Schäfer, Godramstein (DE)

(73) Assignee: Wakol GmbH, Pirmasens (DE)

( * ) Notice: Subject to any disclaimer, the term of this patent is extended or adjusted under 35 U.S.C. 154(b) by 76 days.

(21) Appl. No.: 12/465,556

(22) Filed: May 13, 2009

(65) Prior Publication Data

US 2010/0016477 A1 Jan. 21, 2010

(51) Int. Cl.
*B29C 65/54* (2006.01)
*E04F 15/022* (2006.01)
*C09J 163/00* (2006.01)
*C08L 63/00* (2006.01)

(52) U.S. Cl. ........ 52/747.1; 52/390; 156/71; 156/304.1; 156/330; 523/402

(58) Field of Classification Search .......... None
See application file for complete search history.

(56) References Cited

U.S. PATENT DOCUMENTS

| 2,585,115 | A | * | 2/1952 | Greenlee | 523/454 |
| 2,899,397 | A | * | 8/1959 | Aelony et al. | 523/414 |
| 3,806,483 | A | * | 4/1974 | Bernard et al. | 523/412 |
| 5,539,025 | A | * | 7/1996 | Smith et al. | 523/418 |

FOREIGN PATENT DOCUMENTS

| DE | 19 21 139 A1 | | 8/1977 |
| DE | 2606138 A1 | * | 8/1977 |
| EP | 0 856 619 A2 | | 8/1998 |
| JP | 57155247 | | 9/1982 |

OTHER PUBLICATIONS

Machine translation of DE 2606138 A1, provided by the EPO website (no date).*
Product overview of EPON and EPI-REZ Epoxy Resins, provided by Hexion (2009).*
European Search Report, Counterpart EP Application Serial No. EP08005326, Feb. 28, 2001, European Patent Office, The Hague, Netherlands.

* cited by examiner

*Primary Examiner* — Michael J Feely
(74) *Attorney, Agent, or Firm* — Babcock IP, PLLC

(57) ABSTRACT

The three components composed parquet joint cement system comprises an aqueous epoxy resin dispersion, an amine hardener, which forms a solid adduct, and a wood flour. The solid portion in an aqueous epoxy resin dispersion is 5-10 wt. %, preferably 7-9 wt. % of parquet joint cement. The solid portion in the amine hardener is 4-7 wt. %, particularly 5-6 wt. % of parquet joint cement. An additional component with water mixable organic solvent, selected from alcohols or ketone, preferably ethanol, acetone, isopropanol or their mixture are also provided. An independent claim is also included for a method for producing a parquet joint cement, which involves utilizing an aqueous epoxy resin dispersion, an amine hardener, and wood flour.

17 Claims, 1 Drawing Sheet

DIAGRAM I
Pendulum hardness development
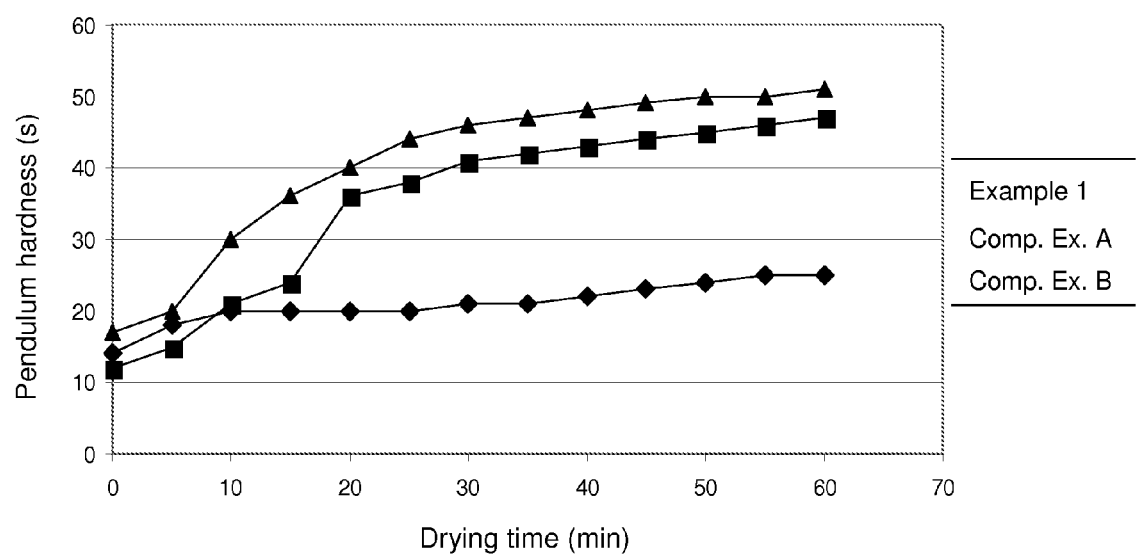

US 8,074,423 B2

PARQUET JOINT KIT SYSTEM AND METHOD FOR MANUFACTURING A PARQUET JOINT KIT SYSTEM

CROSS-REFERENCE TO RELATED APPLICATIONS

Germany Patent Application No. 102007018414.1, "Parquet Joint Kit System and Method for Manufacturing a Parquet Joint Kit System", filed Apr. 17, 2007 and published Oct. 23, 2008 and European Patent Application No. 08005326.7, "Parquet Joint Kit System and Method for Manufacturing a Parquet Joint Kit System", filed Mar. 20, 2008 and published Oct. 22, 2008 are each hereby incorporated by reference in their entirety.

SPECIFICATION

The invention relates to a parquet joint cement system and a method for producing a parquet joint cement.

Such parquet joint cements are used to fill the joints between individual parquet elements.

DIN standard no. 18356 does not separately mention the cementing of parquet joints; however, it does refer to the consequences of gluing edges with sealants having strong adhesive action. The Manual for Parquet Layers and Floor Layers (Publisher: SN-Verlag Hamburg, 2001) by K. Remmert, J. Heller, H. Spang, K. Bauer/Thomas Brehm), on the other hand, addresses the issue of joint cementing in detail.

Solid wood, laminated parquet, mosaic parquet and on-edge lamella parquet are jointed after the intermediate sanding with grain size 60, using a paste consisting of wood cement solution and the obtained sanding dust.

Contrary to the general trend of using water-based, solvent-poor materials in the cementing of joints, solvent-containing joint cements are still predominantly used. The higher consumption due to the more rapid evaporation of the solvents does not change the preference of solvent-containing systems compared with purely aqueous products. While it is possible to treat an area of 20-25 $m^2/l$ with aqueous systems, an area of only 6 $m^2/l$ can be treated with solvent-containing joint cements.

Solvent-based systems contain, for example, a mixture of nitrocellulose wool with readily volatile organic solvents (solids content ca. 8-10%); water-based systems contain as the main component, besides water, a dispersed polyacrylate resin, wherein, depending on the type of resin, fibers having a solidifying effect are added (solids content ca. 20%).

On the one hand, the consistency of the paste that is thickened in this way must be flowable to such a degree that it can easily penetrate into even the smallest joints (<0.5 mm), on the other hand, it must have enough sag resistance so as to not sag in the joints. In the renovation of old floors with joint widths of >2 mm, a second round of troweling to completely fill the insufficiently filled joints is therefore often unavoidable. In the case of oil-based synthetic resin varnishes, which are still sometimes used for special surfaces, such as under-floor heating, on-edge lamella parquet floors or wood blocks, it is also necessary to level off the joint cementing in order to prevent cratering and to obtain an absolutely plane surface after the subsequent sanding process.

For workers, the most significant advantage of solvent-based joint cement compared with water-based joint cement is the faster drying throughout the joints and the associated time savings until the excess joint cement mass can be sanded off. Particularly in the case of differently wide joints or when knotholes occur, which also have to be filled, the drying time of water-based joint cement may be extremely long, e.g. approximately 12 hours, until it can be sanded over.

It is therefore the object of the invention to provide a joint cement system that is at least solvent-reduced, but at best solvent-free, and whose waiting period until the joints can be sanded is as short as it is known from solvent-containing jointing agents, even in the case of wide joints, despite the predominantly or purely aqueous composition and which moreover has an increased ability to take up sanding dust, which is a further means to prevent sagging, as the mass in the joint spaces thus solidifies significantly quicker.

Previous systems (both solvent-based and water-based) also have, to some extent serious, disadvantages with regard to their resistance to light exposure, in particular to direct sunlight. While solvent-based joint cements on light woods often form dark joint lines that are found to be disturbing, water-based systems sometimes develop significant color differences compared with the parquet elements due to the bleaching effect of strong sunlight exposure (floor to ceiling windows, glass doors, southern exposure).

It is therefore a further object of the invention to reduce the light sensitivity of joint material by providing a water-based joint cement system that has noticeable resistance to color changes when exposed to light compared with the known water-based systems.

To achieve this object, a water-emulsified epoxy resin is cross-linked with an amine hardener, and a wood flour is admixed.

DESCRIPTION OF DIAGRAM

Diagram I demonstrates pendulum hardness development between Example 1, Comparative Example A and Comparative Example B with respect to time, according to Table III.

While in non-reactive aqueous dispersions the material properties of the hardened product result by necessity and exclusively from the chemical structure and morphology of the dispersion particles, the structure and morphology of the particles in cross-linking systems can be precisely controlled via the polyaddition reaction with the experiences gained from it. The specific selection of the molecular weight and the conditions of the polyaddition permit keeping the viscosity of the binding components low during the application phase, which in turn enables very good surface wetting of the wood fibers. This simultaneously causes a strong hydrophobicizing effect to occur, which counteracts wood swelling. The high molecular weights necessary for the later solidity of the system are built up via the polyaddition reaction of the oxirane groups of the resin with the amino groups of the hardener. It is thus an advantage of the system that the educts of the reaction have greater hydrophilicity than the used products themselves. The reason for this is that hydrophilic primary amines are converted to hydrophobic tertiary amines. During the hardening reaction, hydrophilicity therefore steadily decreases, causing the water contained in the system to be less strongly held with the increasing amounts of reaction product and thus—in contrast to a single component system—evaporate much more easily. During the hardening process, the emulsifiers or protective colloids necessary for the stability of the purely physically hardening dispersions actually do not change their hydrophilic character.

The polymer scaffolding, which must deliver the necessary hardness of the wood cement mass until sanding can be safely carried out, is not created by physical film-forming of the dispersion, but by chemical cross-linking of the emulsion particles, i.e., the build-up of solidity necessary for sanding is surprisingly reached even under extremely unfavorable drying conditions, such as high humidity or low temperatures, which almost completely prevent water from evaporating and thereby drying. In this case, the water is in fact preserved in separate phases between the wood fibers that were solidified by the produced polymer scaffolding and can then evaporate for the appropriate length of time in each case.

This mechanism can occur according to the invention via the above-described epoxy amine systems, in which a cross-linking between emulsified resin and emulsified hardener particles takes place. For this, polyamine adducts have proven advantageous, whose NH equivalent weights lie between 150 and 200 g/mol NH and whose hydrophobicity is such that they are not soluble in water. Most suitable for this has proven to be a dispersion of a polyamine adduct having a solids content of 55% by weight and an NH equivalent weight of 165 g/mol relative to the solids portion (Epilink 701, Air Produkts Polymers).

As epoxy resin dispersions, dispersions of solid resins have proven to be especially useable in which the resin has an equivalent weight of >300 g/mol EP (relative to the solid), preferably 350 g/mol (e.g. Polypox E 2500/60 W from UPPC).

The parquet joint cement system according to the invention is characterized by the following components
a) an aqueous epoxy resin dispersion
b) an amine hardener forming a solid adduct with a) when a) and b) are mixed and
c) a wood flour.

General description of the joint cement composition in % by weight:

| Component a) | |
|---|---|
| Epoxy resin dispersion (relative to solids content) | 5-10%, preferably 7-9% |
| Component b) | |
| Amine hardener (relative to solids content) | 4-7%, preferably 5-6% |
| Component c) | |
| Wood flour | 9-14%, preferably 10.5-12.5% |
| Water | 60-70%, preferably 64-68% |
| Additional components | |
| Thickeners | 0.1-1%, preferably 0.4-0.8% |
| Water-soluble organic solvents | 0-10%, preferably 6-10% |

Component a)

As epoxy resin dispersions, commonly known aqueous dispersions of bisphenol-A-di-glycidyl ether, bisphenol-F-diglycidyl ether, as well as their higher homologs and mixtures thereof can be considered. Both liquid resins and solutions of solid resin components in organic solvents, e.g. methoxy propyl acetate, can be used. Emulsifiers are used to stabilize the water-dispersed resin particles. Nonionic fatty alcohol ethoxylates are preferably used. Most suitable have proven to be dispersions of solid resins, in which the resin has an equivalent weight of >300 g/mol EP (relative to the solid), preferably 350 g/mol (e.g. Polypox E 2500/60 W from UPPC).

Component b)

As amine hardeners, amine adducts, polyamine adducts, aliphatic polyamines, polyoxyalkylenediamines, polyamidoamines, Mannich bases produced via condensation of phenol, an amine and formaldehyde, and/or transaminated Mannich bases can be considered. The amine-H equivalent weight lies between 140 and 200 g/mol NH, relative to the solid of the amine hardener. Most suitable for this has proven to be a dispersion of a polyamine adduct having a solids content of 55% by weight and an NH equivalent weight of 165 g/mol relative to the solids portion (Epilink 701 from Air Produkts Polymers).

Water

The epoxy resin dispersion is either the only source for the water portion in the parquet joint cement system, or the water portion comes partly from the epoxy resin dispersion and from the amine hardener, provided aqueous emulsions of an amine hardener are used for the production of the parquet joint cement, or the water is additionally added to the formulation.

Component c)

As wood flour, the sanding flour produced in the intermediate sanding (grain size 60) of the parquet surfaces is used.

Additional components

As thickeners, cellulose ethers, carboxylated cellulose ethers, polyvinyl alcohols, polyacrylate thickeners and polyurethane thickeners can be considered. Due to their related structure to the cellulose fibers of wood, cellulose ethers are preferably used (e.g. Walocel MW 40000).

As water-soluble organic solvents, alcohols and ketones having a boiling point of <90° C. can be used; ethanol, acetone and/or isopropanol are preferably used.

For the person skilled in the art it is natural that components a) and b) are initially held ready separately. Component c) is obtained by sanding the parquet to be cemented and can be stirred into either a) or b), or into a mixture of a) and b) or stirred partly into a) and b), depending on the volume of components a) and b). Like the admixture of component c), the additional components, such as thickeners and water-miscible organic solvents, are admixed into either a) or b), or into a mixture of a) and b) or partly into a) and b), depending on the volume of components a) and b). The admixture of component c) can take place before or after the additional components are mixed in or at the same time with the additional components.

The following examples serve only to explain the invention and are not to limit it in any way.

Comparative Example A

A joint cement solution is produced using the following components.

All percentages relate to the component weight (% by weight):
40% polyacrylate dispersion (solids: 50%, Tg: approx. 0° C.)
60% water
Solids content: 20%

The viscosity of the joint cement solution was approx. 1200 mPas at 23° C. according to Brookfield 4/100.

Into 100% by weight of joint cement solution are stirred 15 weight parts of wood sanding flour, obtained by sanding the parquet surface with a sanding means of grain size 60. The mass of wood cement thus produced is used to spackle the sanded parquet surface. For this, an 8 mm beech mosaic parquet (strip size 160 mm×22 mm) is bonded to a V 100 particle board such that joints with up to 1 mm in width occur. Then, using a double blade spatula, the joint cement mass is spackled onto the surface. The panel is dried at 23° C. and 50% rel. humidity, and a 25 cm wide strip each is sanded after 15, 30, 45 and 60 minutes using a grain size 60 sanding means. On the one hand, a visual assessment is carried out to determine how strongly the used sanding means (e.g. paper) is affected by non-hardened cement mass.
(Grade 1=no residue whatsoever on the sandpaper,
grade 6=very strong, greasy residues on the sandpaper)
and on the other hand, a magnifying glass is used to determine how well the joints were filled:
100% filling=joint cement mass finishes flush with the parquet surface
75% filling=slight concave sagging of the joint;
50% filling=strong concave sagging of the joint;
25% filling=strong detaching or strong fissure formation in the joint).

Comparative Example B

A joint cement solution is produced using the following components.
All percentages relate to the component weight (% by weight):
13% nitrocellulose (nitrogen content approx. 12%, Hoppler viscosity at 20° C. of a 9% solution of 400 mPas, degree of substitution 2.2;)
86% acetone
1% diisobutyl phthalate (softener)
Solids content: 13%
The viscosity of the joint cement solution is approx. 900 mPas at 23° C. according to Brookfield 4/100.
Into 100 weight parts of joint cement solution are stirred 15 weight parts of wood sanding flour, obtained by sanding the parquet surface with a sanding means of grain size 60. The mass of wood cement thus produced is used to spackle the sanded parquet surface. For this, an 8 mm beech wood mosaic parquet (strip size 160 mm×22 mm) is bonded to a V 100 particle board such that joints with up to 1 mm in width are created. Then, using a double blade spatula, the joint cement mass is spackled onto the surface. The panel is dried at 23° C. and 50% rel. humidity, and a 25 cm wide strip each is sanded after 15, 30, 45 and 60 minutes using a sanding means (grain size 60). On the one hand, a visual assessment is carried out to determine how strongly the used sandpaper is affected by non-hardened cement mass and, on the other hand, a magnifying glass is used to determine how well the joints were filled.

Example 1

A joint cement solution is produced using the following components. All percentages relate to the component weight (% by weight):
Epoxy resin component, including additional components:

| | |
|---|---|
| POLYPOX E 2500/60 W | 17.4% |
| Walocel MW 40000 solution 2.5% | 30.3% |
| Water | 41.9% |
| Ethanol (denatured spirit) | 10.4% |
| Amine hardener: | |
| Epilink 701 | 12.5% |

15 weight parts of wood sanding flour, obtained by sanding the parquet surface with a sanding means of grain size 60, are mixed into 100 weight parts of joint cement solution, produced by vigorous mixing of 89 weight parts of the epoxy resin component, including additional components, and 11 weight parts of amine hardener. The mass of wood cement thus produced is used to spackle the sanded parquet surface. For this, an 8 mm beech wood mosaic parquet (strip size 160 mm×22 mm) is bonded to a V 100 particle board such that joints with up to 1 mm in width are created. Then, using a double blade spatula, the joint cement mass is spackled onto the surface. The panel is dried at 23° C. and 50% relative humidity, and a 25 cm wide strip each is sanded after 15, 30, 45 and 60 minutes using a sanding means (grain size 60). On the one hand, a visual assessment is carried out to determine how strongly the used sandpaper is affected by non-hardened cement mass and, on the other hand, a magnifying glass is used to determine how well the joints were filled.

TABLE I

| | Comparative Example A | Comparative Example B | Example 1 |
|---|---|---|---|
| 15 min drying | 25% | 75% | 75% |
| 30 min drying | 25% | 100% | 100% |
| 45 min drying | 50% | 100% | 100% |
| 60 min drying | 75% | 100% | 100% |

Assessment of the joint filling following sanding with grain size 60 after different drying times.

TABLE II

| | Comparative Example A | Comparative Example B | Example 1 |
|---|---|---|---|
| 15 min drying | 5 | 2 | 2 |
| 30 min drying | 5 | 1 | 1 |
| 45 min drying | 4 | 1 | 1 |
| 60 min drying | 2 | 1 | 1 |

Assessment of the used sandpaper following sanding with grain size 60 after different drying times.

As is evident from Tables I and II, the experiment results prove that the drying behavior of the water-based epoxy resin joint cement is significantly more favorable than that of a dispersion joint cement in accordance with the prior art. The values for drying speed and filling of the joints actually lie in the range of a high solvent-containing product.

Determining the Solidification Development

The joint cements produced as described above are spread onto a glass plate using a varnish applicator with a gap width of 200 μm. The glass plates are left to dry at 23° C. and 50% humidity. The glass applications are tested in 5 minute intervals using the pendulum hardness according to Koenig. As Table III and Diagram I show, the hardening process of the joint cement system from Example 1 according to the invention correlates strongly with the solvent-containing Comparative Example B, while the comparative example of the aqueous joint cement system A has a significantly slower hardening process.

TABLE III

| | Pendulum hardness (sec) | | |
|---|---|---|---|
| Time (min) | Example 1 | Comp. Ex. A | Comp. Ex. B |
| 0 | 12 | 14 | 17 |
| 5 | 15 | 18 | 20 |
| 10 | 21 | 20 | 30 |
| 15 | 24 | 20 | 36 |
| 20 | 36 | 20 | 40 |
| 25 | 38 | 20 | 44 |
| 30 | 41 | 21 | 46 |
| 35 | 42 | 21 | 47 |
| 40 | 43 | 22 | 48 |
| 45 | 44 | 23 | 49 |
| 50 | 45 | 24 | 50 |
| 55 | 46 | 25 | 50 |
| 60 | 47 | 25 | 51 |

Assessment of Color Changes Through UV Light Exposure

Nail holes (approx. 2 mm in diameter) were put into 8 mm solid wood parquet elements of the respective type of wood and subsequently filled with joint cement, consisting of original sanding dust and the appropriate cement system.

One section was illuminated by a xenon lamp for 72 hours, the other section was exposed to natural light through a window pane for 3 months.

The color changes of the cemented sections were visually assessed in comparison to the remaining wood and evaluated with a 0-5 evaluation system.

0 no change 1 slight, only contrasting change 2 clearly noticeable change light/dark 3 color change 4 strong color change 5 extremely strong color change As the results of Table IV and Table V show, Example 1 according to the invention shows distinctly favorable coloring behavior after light exposure. None of the 6 tested types of wood showed color changes when illuminated by a xenon lamp, whereas the appropriate aqueous joint cement from the prior art (cf. Ex. A) showed color changes in 4 of 6 types of wood. In the illumination under natural conditions, Example 1 according to the invention also showed significantly better behavior: All 6 types of wood showed either no or only slightly contrasting changes, while Comparative Example A already showed clearly noticeable light/dark changes in 3 of 6 cases.

TABLE IV

| | (illumination 72 hours xenon lamp) | | | | | |
|---|---|---|---|---|---|---|
| | European cherry | Kempas | Merbau | Ipe | Cumaru | Jatoba |
| Ex. 1 | 1 | 0-1 | 1 | 2 | 2 | 0-1 |
| Comp. ex. A | 2 | 3 | 1 | 3 | 4 | 2 |
| Comp. ex. B | 0-1 | 0-1 | 0 | 2 | 1-2 | 0 |

TABLE V

| | (illumination 3 months natural light through window) | | | | | |
|---|---|---|---|---|---|---|
| | European cherry | Kempas | Merbau | Ipe | Cumaru | Jatoba |
| Ex. 1 | 0 | 0-1 | 0 | 0 | 1 | 0-1 |
| Comp. ex. A | 0 | 2 | 1 | 2 | 3 | 1 |
| Comp. ex. B | 2 | 0-1 | 0 | 0-1 | 1 | 0-1 |

The invention claimed is:

1. A parquet joint cement system comprising:
   a) an aqueous epoxy resin dispersion containing an emulsifier;
   b) an amine hardener or an aqueous emulsion of an amine hardener, which forms a solid adduct with a) when a) and b) are mixed;
   c) a wood flour; and
   d) water-miscible organic solvent;
      wherein component b) has an amine-H equivalent weight of between 140 and 200 g/mol, relative to the solids content of the amine hardener;
      wherein component d) comprises at least one alcohol or ketone having a boiling point <90° C.; and
      wherein component d) is present in a positive amount of up to 10% by weight, relative to the total parquet joint cement system.

2. The parquet joint cement system according to claim 1, wherein the epoxy resin of component a) comprises at least one of: bisphenol-A-diglycidyl ether; bisphenol-F-diglycidyl ether; a homolog of bisphenol-A-diglycidyl ether; and a homolog of bisphenol-F-diglycidyl ether.

3. The parquet joint cement system according to claim 2, wherein the solids portion in component a) lies in the range of 5 to 10% by weight, relative to the total parquet joint cement system.

4. The parquet joint cement system according to claim 2, wherein component a) has an epoxy equivalent weight of >300 g/mol, relative to the solids content of the epoxy resin.

5. The parquet joint cement system according to claim 1, wherein the solids portion in component a) lies in the range of 5 to 10% by weight, relative to the total parquet joint cement system.

6. The parquet joint cement system according to claim 1, wherein component a) has an epoxy equivalent weight of >300 g/mol, relative to the solids content of the epoxy resin.

7. The parquet joint cement system according to claim 1, wherein the amine hardener or the aqueous emulsion of an amine hardener of component b) comprises at least one of: an amine adduct; a polyamine adduct; an aliphatic polyamine; a polyoxyalkylenediamine; a polyamidoamine; a Mannich base produced via condensation of phenol, an amine and formaldehyde; and a transaminated Mannich base.

8. The parquet joint cement system according to claim 1, wherein the solids portion in component b) lies in the range of 4 to 7% by weight, relative to the total parquet joint cement system.

9. The parquet joint cement system according to claim 1, wherein the solids portion of component c) lies in the range of 9 to 14% by weight, relative to the total parquet joint cement system.

10. The parquet joint cement system according to claim 1, wherein component c) is sanding flour of parquet to be cemented.

11. The parquet joint cement system according to claim 1, further comprising, as an additional component, at least one thickener selected from organic thickeners and inorganic thickeners.

12. The parquet joint cement system according to claim 11, wherein the thickener is present in an amount of 0.1 to 1% by weight, relative to total parquet joint cement system.

13. A method for producing the parquet joint cement system according to claim 11, wherein components a), b), c), d) and the at least one thickener are mixed in any order until homogeneity is reached.

14. A method of filing parquet joints comprising filling a parquet joint with the parquet joint cement system according to claim 11.

15. The parquet joint cement system according to claim 1, wherein water is present in an amount of 60 to 70% by weight, relative to the total parquet joint cement system.

16. A method for producing the parquet joint cement system according to claim 1, wherein components a), b), c), and d) are mixed in any order until homogeneity is reached.

17. A method of filing parquet joints comprising filling a parquet joint with the parquet joint cement system according to claim 1.

* * * * *